(No Model.)

T. R. ROSSITER.
SEWING MACHINE.

No. 566,538.　　　　　　　　Patented Aug. 25, 1896.

Witnesses
E. J. Griswold
L. Menke

Inventor:
Thomas R. Rossiter
By his attorneys
Howson and Howson (No Model.) 8 Sheets—Sheet 4.

T. R. ROSSITER.
SEWING MACHINE.

No. 566,538. Patented Aug. 25, 1896.

Witnesses:
E. J. Griswold
L. Wenke

Inventor
Thomas R. Rossiter
By his attorneys
Howson and Howson (No Model.)　　　　　　T. R. ROSSITER.　　　8 Sheets—Sheet 6.
SEWING MACHINE.

No. 566,538.　　　　　　　　Patented Aug. 25, 1896.

Fig. 8.

Witnesses:
E. J. Griswold
L. Wenke

Inventor:
Thomas R. Rossiter
By his attorneys
Howson and Howson (No Model.) 8 Sheets—Sheet 8.

T. R. ROSSITER.
SEWING MACHINE.

No. 566,538. Patented Aug. 25, 1896.

Fig. 10.

Witnesses:
E. J. Griswold
L. Wenke

Inventor:
Thomas R. Rossiter
By his attorneys
Howson and Howson

UNITED STATES PATENT OFFICE.

THOMAS R. ROSSITER, OF LONDON, ENGLAND, ASSIGNOR TO CHAPPELL ALLEN & CO., OF SAME PLACE.

SEWING-MACHINE.

SPECIFICATION forming part of Letters Patent No. 566,538, dated August 25, 1896.

Application filed November 11, 1895. Serial No. 568,630. (No model.) Patented in England December 6, 1892, No. 22,388.

*To all whom it may concern:*

Be it known that I, THOMAS ROBERT ROSSITER, a subject of the Queen of Great Britain and Ireland, and of the firm of Chappell Allen & Co., corset-manufacturers, of 24 Basinghall Street, in the city of London, England, have invented certain Improvements in Multiple-Needle Sewing-Machines, (for which I have, in conjunction with John Chappell, of 24 Basinghall Street aforesaid, obtained a patent in Great Britain, No. 22,388, dated December 6, 1892,) of which the following is a specification.

This invention relates to multiple-needle sewing-machines for sewing two or more lines of stitching simultaneously, and has for its object to provide means whereby the distance apart of the lines of stitching may be varied without altering or affecting the direction of feed.

The invention is applicable to double-thread or lock-stitch machines, and also to single-thread or chain-stitch machines, and as the action of the parts in both classes of machines is similar the description thereof as applied to a shuttle-machine will equally apply to a single-thread machine.

According to this invention the loopers (or shuttles, as the case may be) are carried in recesses provided in a circular box fitted to turn in a recess in the bed-plate of the machine, the said circular box carrying also the needle-plate and gearing through which the shuttles are driven, so that they can be turned together upon or around one center or axis. The needles are carried by a needle-head which may be made to turn on or in the needle-bar, or the needle-bar itself may be made to turn in the head of the machine, the center of rotation being coincident with that upon which the box carrying the shuttles and adjuncts are rotated, as aforesaid.

I will describe my invention with reference to the accompanying drawings, Figure 1 of which is a side view of so much of a sewing-machine as is necessary to illustrate the application of this invention thereto.

The machines illustrated are constructed to make four rows of stitching, but it will be understood that a machine can be similarly made to make two or any greater number of rows of stitching by providing the corresponding number of parts, as hereinafter described with respect to these machines, for sewing four rows of stitching.

The shuttle-carriers A are mounted in recesses in a circular box $A^2$, with the needle-plate B at top and with covers for the recesses which form part of the cloth-plate. The said carriers are each formed or provided with a stem which passes through the box $A^2$ and carries a crank-disk $a'$ for driving. The box $A^2$ is capable of being rotated in a circular groove formed in the base-plate of the machine, in which groove runs the projecting ring $a$ on the box $A^2$, it being kept in place by the plates $a^2$. A spring bolt or catch C, mounted on the base-plate, engages with notches $b^3$ in the circular box $A^2$ to secure it in the position to which it has been adjusted.

Figure 6:
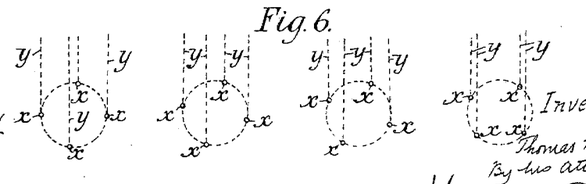
Fig. 6 is a diagram showing four different positions of the needles.
Figure 7:
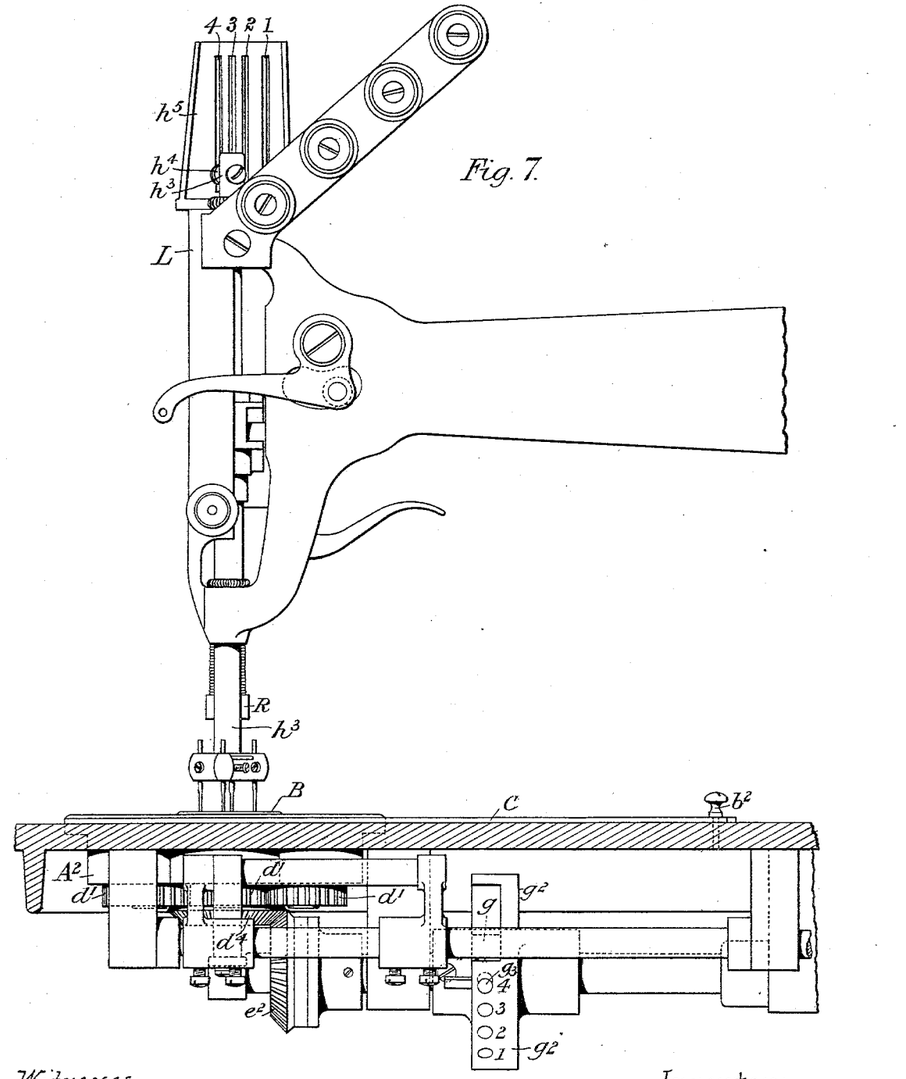
Fig. 7 is a side elevation of a portion of a similar machine, showing another form of the driving mechanism and the adjusting devices for the needles and shuttles.
Figure 8:
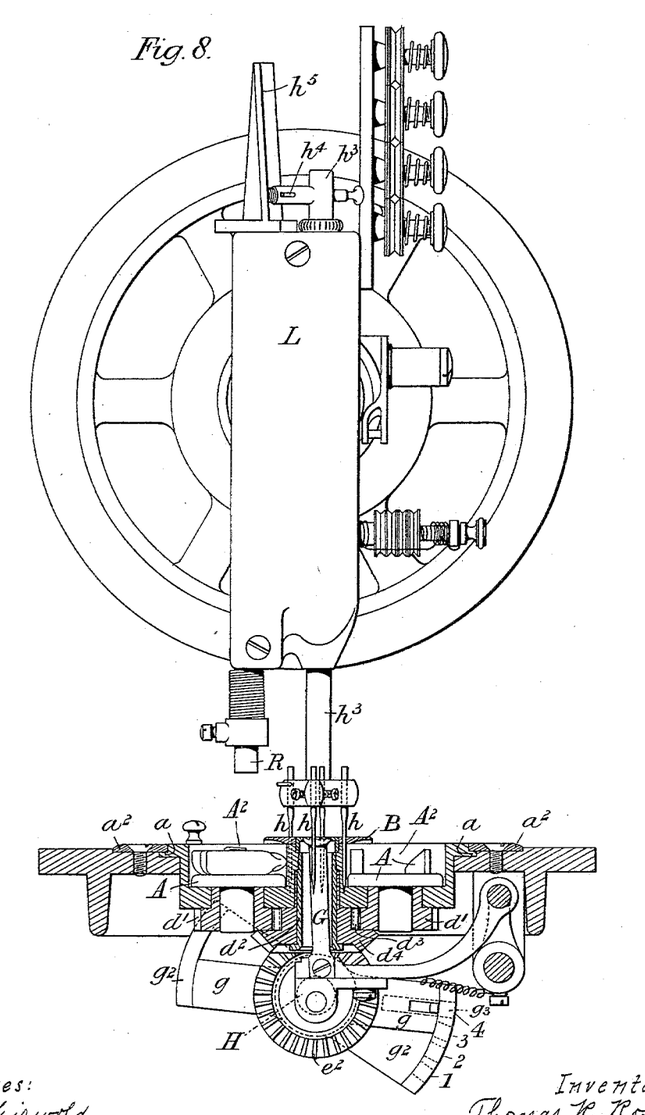
Fig. 8 is an end view, partly in section.
Figure 9:
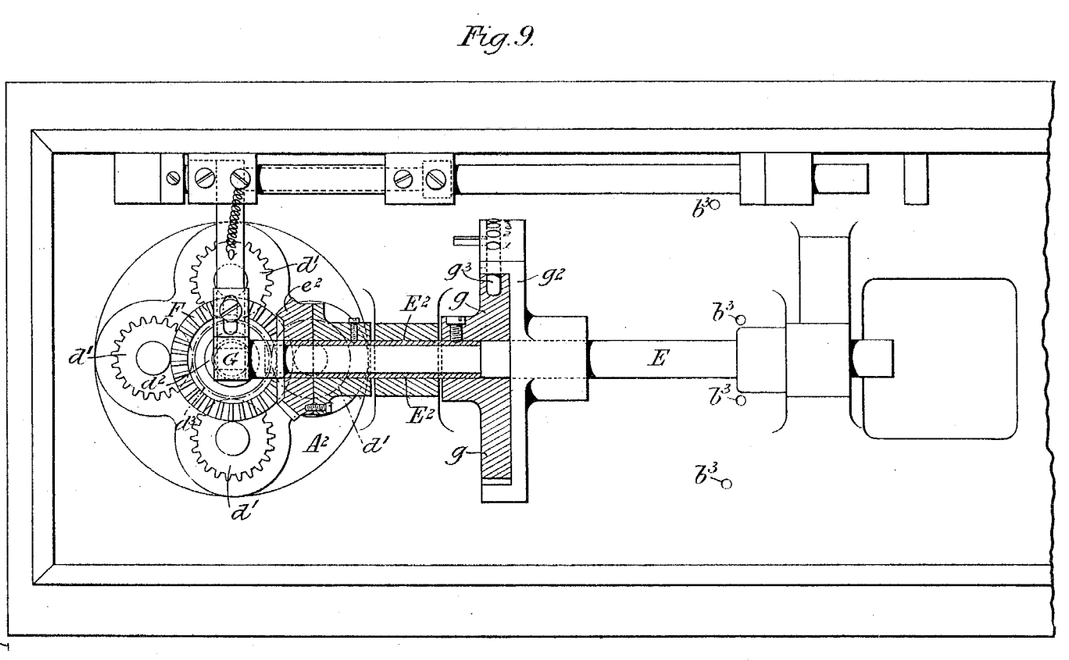
Fig. 9 is a view of the under side, showing the driving-gear.
Figure 10:
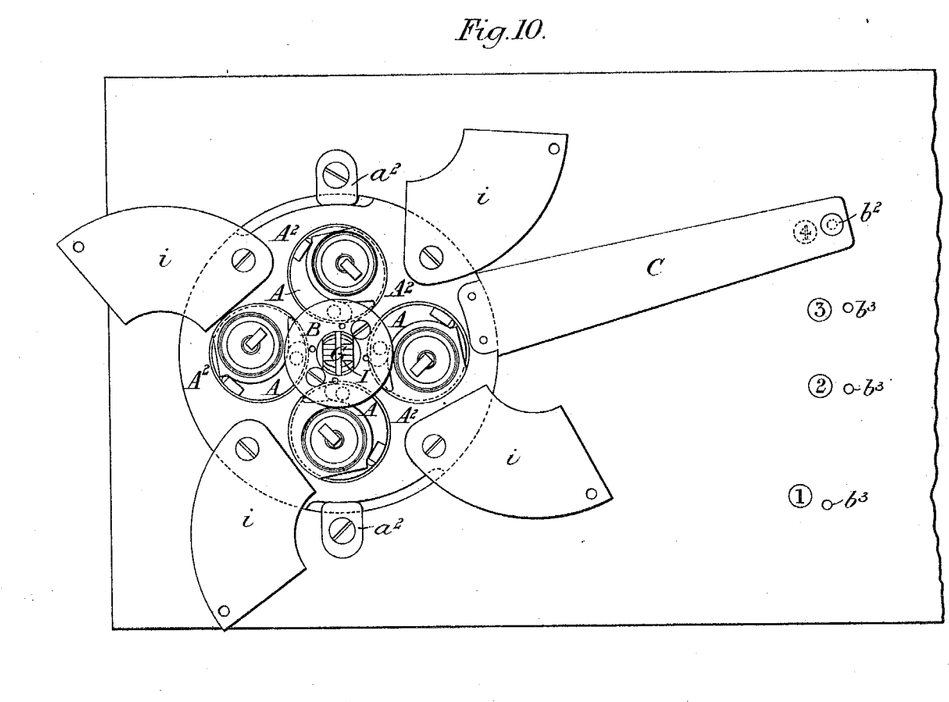
Fig. 10 is a plan of the cloth-plate and needle-plate.

The shuttle-carriers and their shuttles are rotated in their circular recesses by means of the connecting-rod D and shaft E and gearing, as hereinafter described, by a crank driven from the main shaft of the machine. The shaft E is provided with the bevel-wheels $e\ e^2$, gearing with the bevel-wheels $e^3\ e^4$, mounted on the studs $f$, the said wheels $e^3$ and $e^4$ being furnished with crank-pins $f^2$, to which the connecting-rod D is secured, the said connecting-rod having a loop $d$ in it to enable it to pass the gearing-wheel $e^2$, and with a ring portion $d^2$ to enable it to pass the cloth-feed G, (which cloth-feed may be operated in the usual way.) The said ring portion $d^2$ has secured to it by the screws $d^4$ another ring, $d^3$, the said ring $d^3$ receiving the crank-pins $a^3$, secured one to each of the shuttle-carriers. By moving the box $A^2$ through a partial rotation the distances between the rows of stitching can be varied, as illustrated by the diagrams, Fig. 6, the circles $x$ representing the line of action of the needles and the lines $y$ the lines of stitches. The machine is shown as being provided with notches $b^3$ for four adjustments, but it may of course be made to have any desired number of adjustments.

Figure 1:
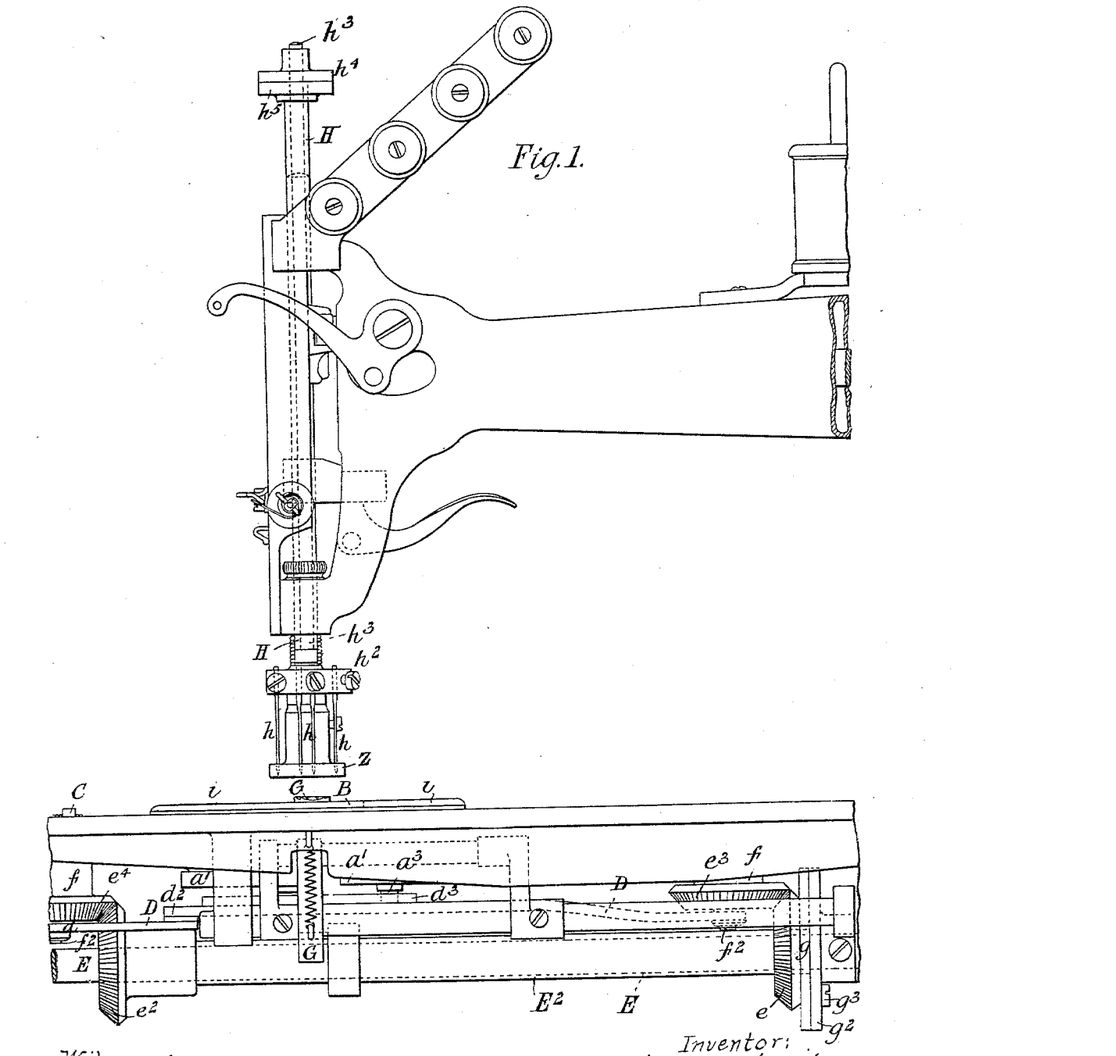
Figure 2:
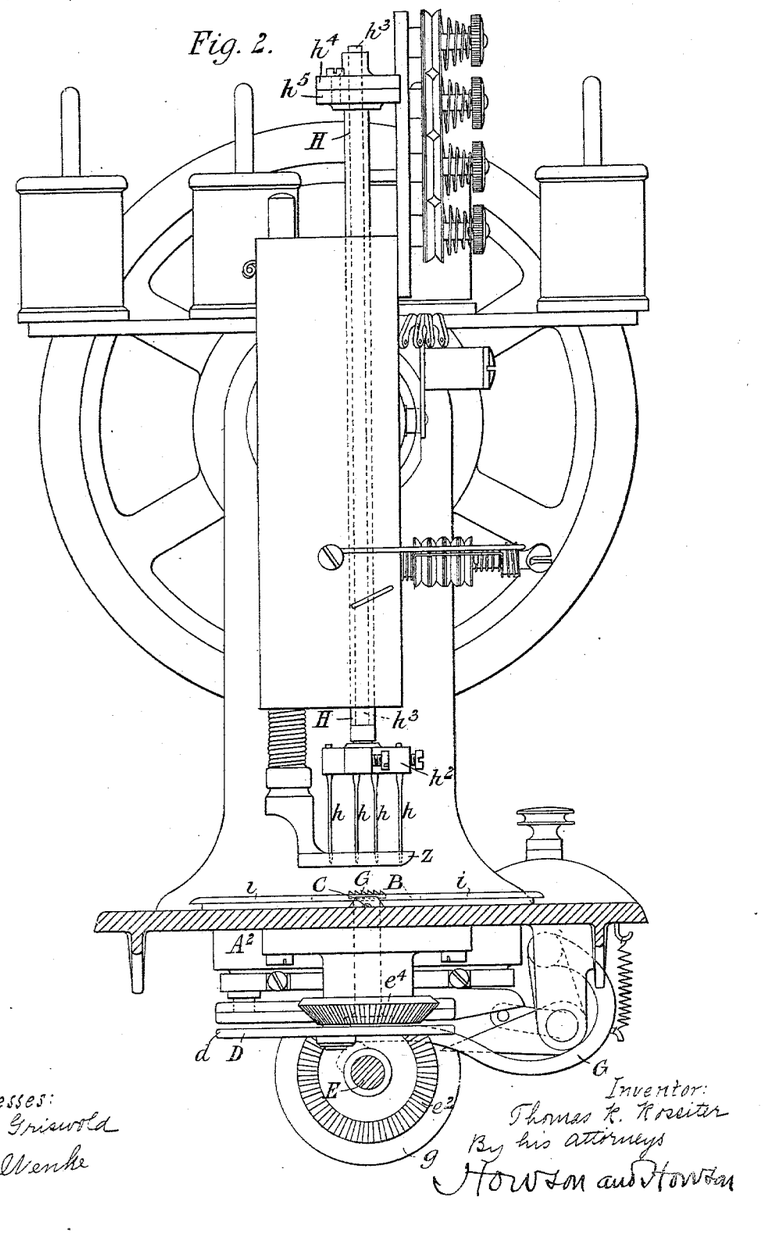
Fig. 2 is an end view, partly in section.
Figure 3:
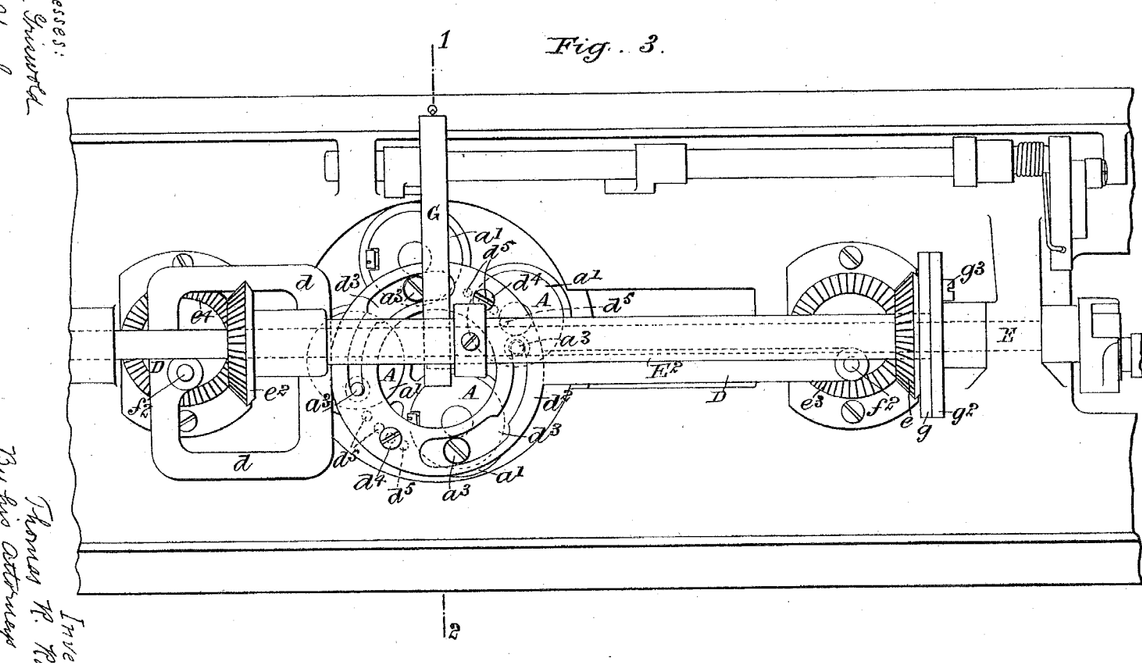
Fig. 3 is a plan of under side.
Figure 4:
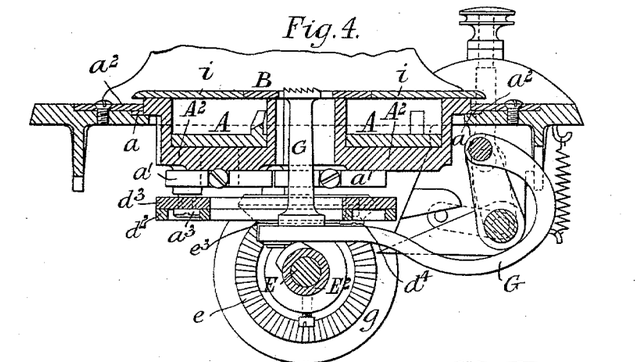
Fig. 4 is a transverse section on the line 1 2, Fig. 3.
Figure 5:
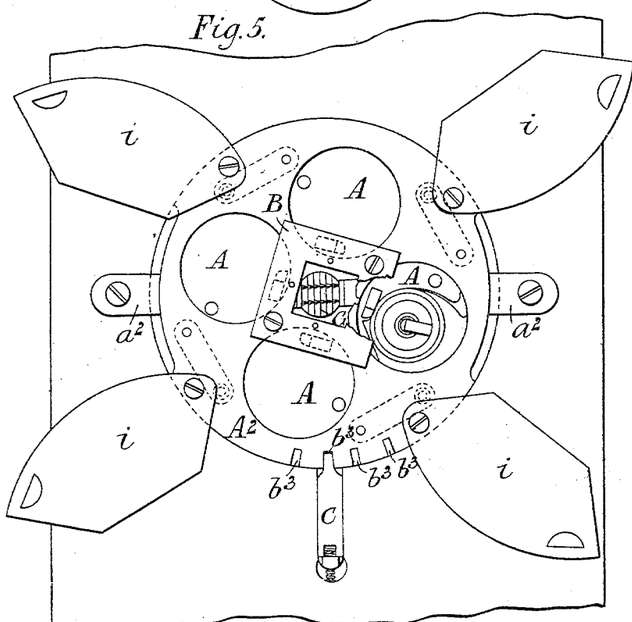
Fig. 5 is a plan of the cloth-plate and needle-plate with the flaps which cover the shuttles opened out and with one of the shuttles in place and with part of the needle-plate broken away.

To alter the distance between the rows of stitching to be made, four adjustments are necessary, namely: First, the needle-bar must be turned axially in the head of the machine to bring the needles into the position to make the rows of stitching at the required distances apart; second, the box A must be moved through a partial rotation to bring the holes in the needle-plate into position to correspond to the altered position of the needles; third, the shuttle-carriers must be turned in their recesses so as to properly time the shuttles with reference to the position of the needles; and, fourth, the presser-foot, having holes therein corresponding to the position of the needles, must be fitted to the machine. Before the box $A^2$ is adjusted by partial rotation the screws $d^4$ are removed, so as to allow the ring $d^3$ to turn upon the ring $d^2$, the ring $d^2$ being provided with circularly-disposed slots, as shown in Fig. 3, to allow the ring $d^3$ to move around upon the ring $d^2$. The screws $d^4$ are, after the box has been adjusted, inserted in the screw-holes $d^5$ in the ring $d^3$, which come opposite the said screw $d^4$, there being provided for each screw $d^4$ a number of such screw-holes corresponding to the number of the notches $b^3$, and at such a distance apart that they come opposite the screws $d^4$ when the notches $b^3$ come opposite the spring-catch C.

The gear-wheels $e$ $e^2$ are mounted on the shaft E by means of a tube $E^2$, to which the said wheels are affixed, the attachment of the said wheels and tube to the shaft E being effected by means of a disk $g$ or secured to the wheel $e$ (or to the tube $E^2$) and a disk $g^2$, secured to the shaft E, the said disks being secured together by means of a screw or screws $g^3$, holes for the screws in one of the disks being provided, as explained with regard to the rings $d^2$ $d^3$.

$h$ $h$ $h$ $h$ are the four needles secured in a needle-head $h^2$, affixed to a rod $h^3$, passing through the tube H, which tube during the working of the machine is operated as the needle-bar of a sewing-machine is ordinarily operated. The rod $h^3$ is secured to the tube H by means of the disks $h^4$ $h^5$, secured, respectively, to the rod and the tube, screws securing the disks together. When the screw or screws is or are removed, the rod $h^3$ can be rotated in the tube H and the needles $h$ be brought into a position to correspond with the adjusted position of the shuttles by the partial rotation of the box $A^2$. Holes for the screws are made in one of the disks ($h^4$ or $h^5$) in such positions as to enable the disks to be secured together in either of the adjusted positions of the needles.

The machine is provided with bobbin-carriers, tension devices, and take-ups corresponding in number to the number of shuttles and needles.

Z is the presser-foot, perforated with holes to correspond with the number and positions of the shuttles and needles, the said presser-foot being removable, so that different feet perforated with holes in the proper positions relatively to the shuttles and needles can be put in place when the machine has been adjusted.

When the machine is in operation, the gearing $e$ $e^2$ $e^3$ $e^4$ operates the shuttle-carriers by means of the connecting-rod D and crank-pins $a^3$.

To adjust the machine to alter the distance apart of the lines of stitching, the spring-catch C is drawn back and the screws $d^4$ are removed and the box $A^2$ with the needle-plate and the shuttle-carriers, shuttles, and ring $d^3$ are moved through a partial rotation, and then the spring-catch C is engaged with the notch $b^3$, which is now opposite it, and the screws $d^4$ are inserted in the holes $d^5$, which are now opposite them. Then the screws which secure the disks $h^4$ $h^5$ are removed and the disk $h^4$ and rod $h^3$ and needle-head $h^2$ and needles $h$ are rotated until they are brought into a position corresponding to that of the shuttles, and the screws are inserted into the holes in the disks $h^5$, which are now opposite to them. The presser-foot Z is then removed and another presser-foot is put in place with holes for the needles in positions corresponding to the altered positions of the needles and shuttles. If preferred, the perforated part of the presser-foot may be made so that it can be rotated in the main part of the presser-foot to bring the holes in the presser-foot into position to correspond with the altered position of the needles and shuttles, the said perforated part being fixed in its adjusted position by a catch or screw or other convenient means. I have shown separate covers $i$ for covering each shuttle, but one cover or any convenient number of covers can be used.

In order to adjust the timing of the movement of the shuttles relatively to the needles, the screws $g^3$ of the disks $g$ $g^2$ are withdrawn and the tube $E^2$ is turned upon the shaft E, so as to move back the gear a distance corresponding to that through which it was moved forward when the shuttles and their adjuncts were adjusted. The screws $g^3$ are then inserted in the holes which are now opposite them, so as to secure the disks $g$ and $g^2$ again together.

Referring to Figs. 7, 8, 9, and 10, the shuttle-carriers are, in this form of my invention, each formed or provided with a stem which passes through the bottom of the recess in the box $A^2$, as in the arrangement before described, and fast on each stem is a pinion $d'$, gearing with a pinion $d^3$, mounted on a hollow stem or stud $d^2$, depending from the center of the box $A^2$. Cast in one with or connected to the pinion $d^3$ is a bevel-wheel $d^4$, with which gears a corresponding wheel $e^2$, fast on a sleeve $E^2$, mounted on the shaft E, the shuttle-carriers being rotated in their circular recesses by means of the said bevel-wheels and the pinions $d'$ and $d^3$. The cloth-feed G passes through the hollow stem or stud $d^2$ and may be operated in the usual way. For adjusting the position of the needles and holding them in their adjusted position the needle-bar $h^3$ is capable of being turned axially in the head L of the machine, and is provided at its upper end with a spring-bolt $h^4$, which can be inserted into any one of four slots or openings 1 2 3 4 in a plate $h^5$, secured to the head L, so as to retain the needles in the position to which they are adjusted, the said bolt $h^4$ sliding up and down in the said slot or opening with the movements of the needle-bar when the machine is at work.

Attached to the box $A^2$ is a spring-plate $c$, by means of which the said box can be turned, the said spring-plate being provided with a stud $b^2$ to engage one or other of a series of holes $b^3$, provided in the base or bed plate and numbered 1 2 3 4, corresponding to the slots in which the spring-bolt on the needle-bar slides. The holes in the bed-plate are so situated that when the stud on the spring-plate is inserted in one of the said holes the position of the box $A^2$ will be correct with reference to the position of the needles, providing the spring-bolt on the needle-bar be inserted in the slot having the number corresponding to the number into which the stud on spring-plate C is inserted. By partially rotating the box $A^2$ the shuttle-carriers, by reason of the pinions $d'$ being in gear with the pinion $d^3$, will receive a partial rotation in their recesses, and consequently are put out of time with the movements of the needles and require to be properly timed, for which purpose the sleeve $E^2$, on which the bevel-wheel $e^2$ is mounted, is provided with an arm $g$, carrying a spring-bolt $g^3$, which may be made to engage in one or other of a series of holes provided in a segmental arm $g^2$, fast on the shaft E, so as to cause the sleeve to rotate with the said shaft. The holes in the segmental arm $g^2$ are numbered 1 2 3 4, corresponding to the holes $b^3$ in the bed-plate into which the stud $b^2$ on the spring-plate is inserted and also to the slots in which the bolt on the needle-bar slides, so that by turning the sleeve $E^2$ and inserting the bolt $g^3$ in a hole in the segmental arm having a number corresponding to that of the hole into which the stud on the spring-plate is inserted the shuttles will be turned into position to be correctly timed to work with the adjusted position of the needles. A presser-foot having holes therein corresponding to the adjusted position of the needles is then fixed in position on the bar R and the machine is ready for work.

The parts which I have not described may be like or similar to the corresponding parts in ordinary sewing-machines, and they may be operated in the same manner.

I wish it to be understood that by the use of the term "loopers" in the claims I intend to embrace the specific form of loopers known in the art as "shuttles" and disclosed herein, as well as all other forms of loopers which are used in the art for forming, in coöperation with needles, the different kinds of stitches.

I claim as my invention—

1. In sewing-machines for sewing two or more rows of stitching, the combination of two or more adjustable needles, with means for actuating the needles, and two or more loopers with a support or holder for the said loopers mounted to turn about a center to adjust the loopers to vary the distance apart of the lines of stitches, and means for actuating the loopers, substantially as set forth.

2. In sewing-machines for sewing two or more rows of stitching, the combination of two or more adjustable needles, with means for actuating the needles, two or more loopers and mechanism for driving the loopers, with a support or holder for the said loopers, mounted to turn about a center to change the positions of the loopers to vary the distance apart of the lines of stitches, and means for adjusting the said driving mechanism according to the various positions of the loopers, substantially as set forth.

3. In sewing-machines for sewing two or more rows of stitching, the combination of two or more needles and a needle-head adapted to be turned about a central point, means for actuating the needles, with two or more loopers, a support therefor the said support mounted to turn about a center in line with the central point around which the said needle-head turns, and means for actuating the loopers, all substantially as and for the purpose set forth.

4. In sewing-machines for sewing two or more rows of stitching, the combination of two or more needles and a needle-head mounted to turn about a central point, means for actuating the needles, with two or more loopers, a support therefor mounted to turn about a center in line with the central point around which the said needle-head turns, mechanism for driving the loopers and means for adjusting the said mechanism, substantially as set forth.

5. In sewing-machines for sewing two or more rows of stitching, the combination of two or more adjustable needles, with means for actuating the needles, and two or more loopers and looper-carriers with a support or holder for the same mounted to rotate about a central point, the driving-shaft, a hollow stud depending from said support and provided with a pinion, means for driving the pinion from the driving-shaft of the machine, pinions on the looper-carriers gearing with the said pinion on the hollow stud, and a cloth-feed passing through the hollow stud, all substantially as set forth.

In testimony whereof I have signed my name to this specification in the presence of two subscribing witnesses.

THOMAS R. ROSSITER.

Witnesses:
WILLIAM HENRY BROWN,
E. HOLLOMON.